C. H. CLIFTON.
PARTING OR CUTTING OFF MACHINE.
APPLICATION FILED OCT. 31, 1916.

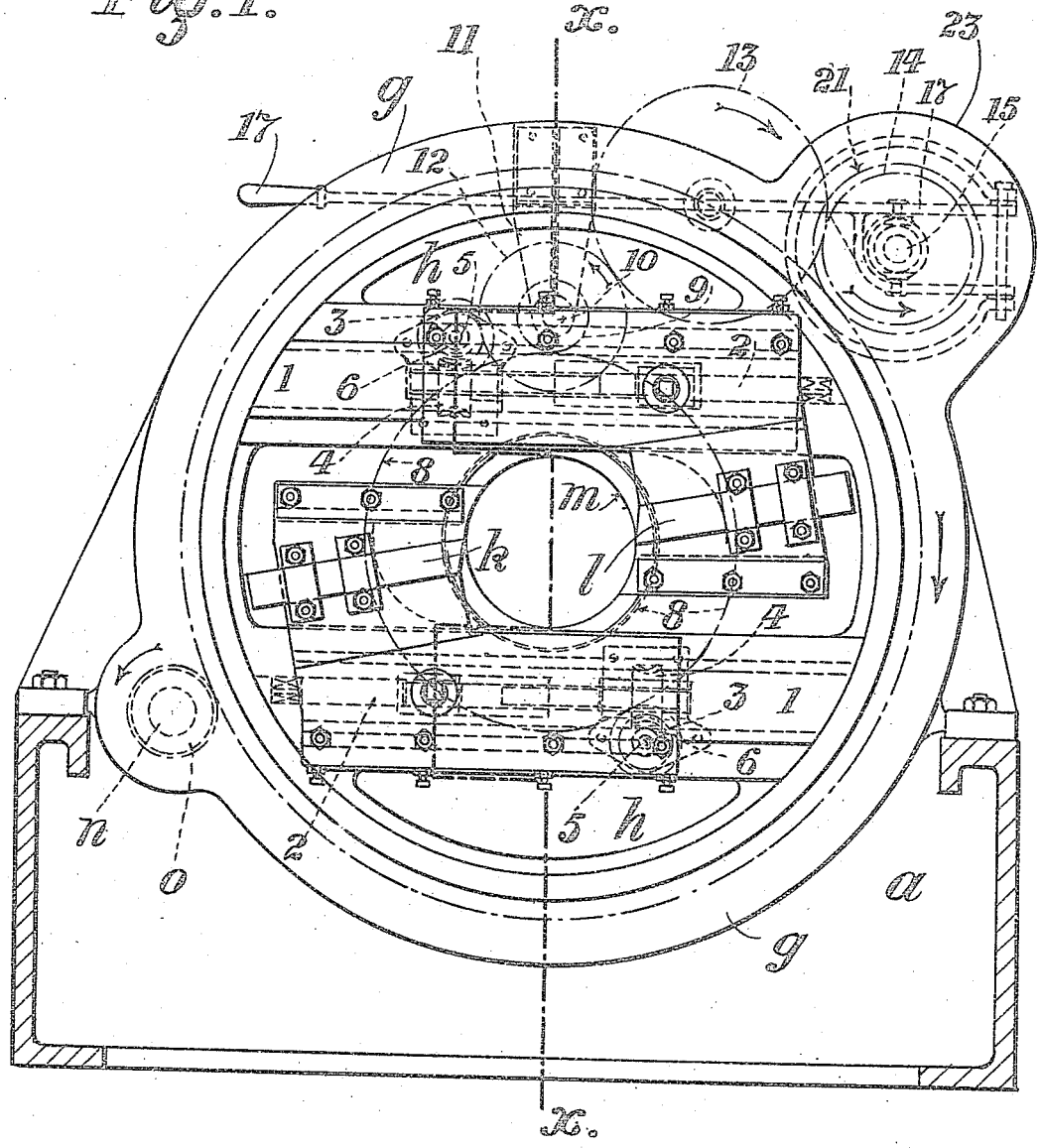

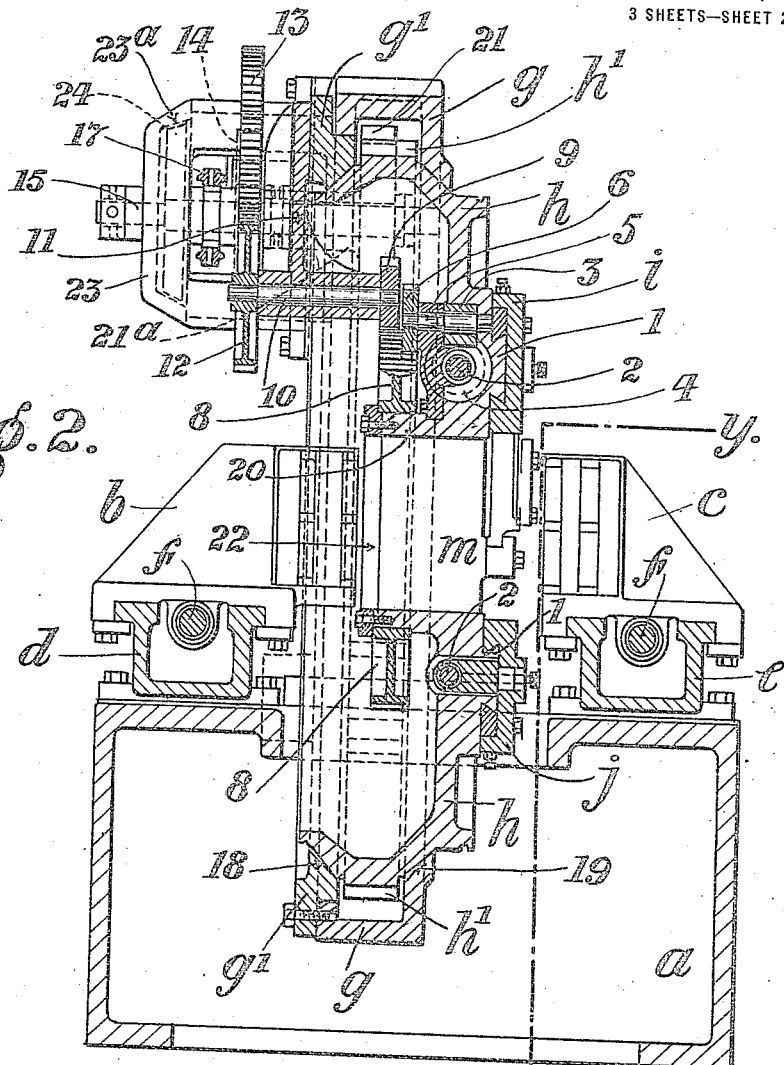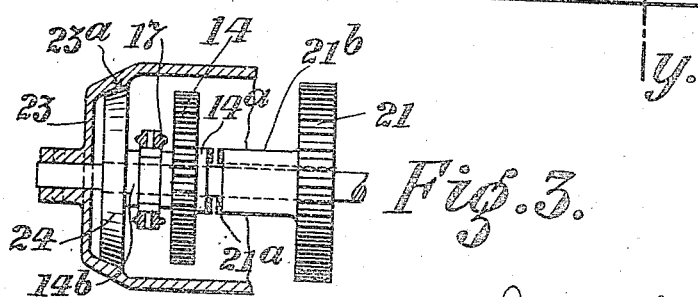

1,248,079.

Patented Nov. 27, 1917.

UNITED STATES PATENT OFFICE.

CHARLES HENRY CLIFTON, OF JOHNSTONE, NEAR GLASGOW, SCOTLAND.

PARTING OR CUTTING-OFF MACHINE.

1,248,079.　　　　　Specification of Letters Patent.　　Patented Nov. 27, 1917.

Application filed October 31, 1916. Serial No. 128,708.

*To all whom it may concern:*

Be it known that I, CHARLES HENRY CLIFTON, a subject of the King of Great Britain, residing at Johnstone, near Glasgow, Scotland, have invented certain new and useful Improvements in Parting or Cutting-Off Machines, of which the following is a specification.

This invention relates to power driven machines for cutting off portions of ingots, bars, and such like. Such machines are known as "parting" or "cutting off" machines their characteristic feature being that the work is held stationary while the cutting tools revolve with a face plate and cut into and, or, through the work.

In such machines it is very desirable the bearing, or bearings, for the revolving face plate carrying the cutting tool, or tools, should be narrow so as to allow of vise grips holding the work at either the front or the back, or at both front and back, as desired, and also, to allow of the cut off portions, if completely severed, being readily withdrawn. At present, machines of this character provided with a screw feed are made but the feed is intermittent in its action, and, therefore, the feed of the cutting tool, or tools, is also intermittent with the consequent disadvantages that intermittent stresses are put upon the mechanism thereby preventing high speeds and heavy feeds, while there is a lack of control over the feed owing to the difficulty of disengaging the feed pawl while the face plate is revolving.

Now the object of the present invention is to combine, with a machine having a narrow bearing, or bearings, for the revolving face plate, a screw feed arrangement which is continuous in its action, the feed mechanism being constructed and arranged, preferably at the back of the face plate in such manner that a uniform stress is put on the mechanism during the feed operation so that the machine runs much more smoothly than heretofore and can be run at a higher speed and also with a heavier feed if required. The arrangement is so constructed as to enable the operator to have such control over the screw feed mechanism, that he can, while the machine is working, stop or start the feed mechanism or withdraw the cutter or cutters, as desired.

The invention may be carried out in various ways to suit different constructions of machine but, preferably, I would construct and arrange the feed mechanism in such manner that each tool carrier or holder would work on a guide on the face plate of the machine and would be moved by a screw arrangement driven by worm gear, the mechanism being located at the back of the face plate. The worm gear would be rotated by, or from, spur or other gear driven by a rotatable annulus or ring which would be toothed and freely carried and would be rotatable at a higher speed than that of the face plate by means of spur or other gearing driven from the face plate and driving shaft which latter would have on it a pinion engaging with external or internal teeth on the face plate so as to rotate the same. The gearing disposed between the rotatable annulus and the driving shaft would, preferably, be change speed gearing, of any well known and suitable character, and an arrangement would be provided whereby the gearing could be thrown into and out of action by the movement of a lever or handle. Means, such as a friction wheel or the like, would also be provided whereby, upon the movement of the lever or handle, the annulus could be held stationary so that, when so held, the screw feed mechanism would be caused to rotate, in the reverse direction, and withdraw the cutter, or cutters.

In order that the invention may be clearly understood I have hereunto appended an explanatory drawing whereon I have shown, by way of illustration or example, one mode of carrying out the invention.

Figure 1 is an elevation with part in section of a parting or cutting off machine having my improvements applied thereto. The section is taken on the line $v-v$, Fig. 2.

Fig. 2 is a sectional elevation taken on the line $x-x$, Fig. 1.

Fig. 3 is a detail view.

Figure 4:
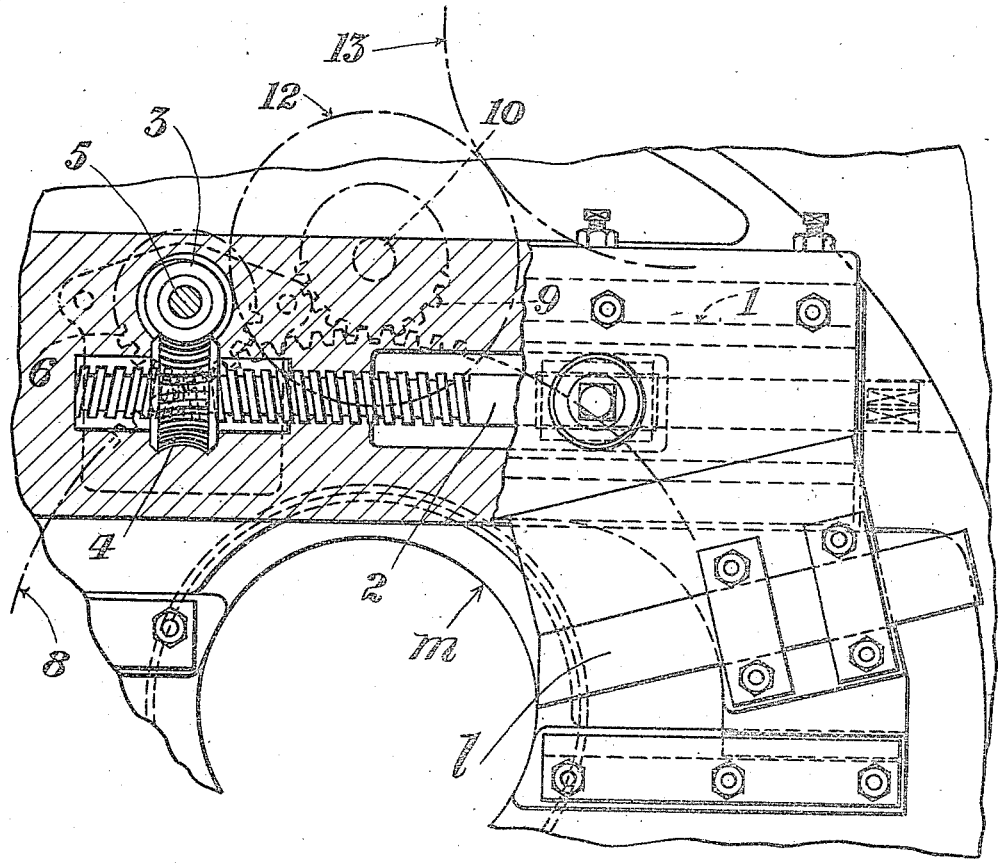
Fig. 4 is an enlarged detail view showing a feed screw 2 and its gear.

$a$ is the bed plate of the machine; $b$, $c$, are vise grips for holding the work; $d$, $e$, are guides upon which the vise parts slide, the parts of each vise being moved toward or away from one another by means of screws $f$ in the usual and well known manner. $g$ is an annular bearing supported on the bed plate. $h$ is the annular face plate which is revolubly fitted within the bearing $g$ and carries tool slides $i$, $j$, and tools $k$, $l$. $m$ is the usual opening at the center of the face plate through which the work passes being held fixedly in position by one or both vise grips *b*, *c*.

The face plate *h* which is hollow at the back, as shown, has bearing surfaces 18, 19, these surfaces working against corresponding surfaces on the annular bearing *g* which is made in two parts *g*, *g*¹, the part *g*¹ being removably secured to the part *g*. As will be seen the bearing is narrow and is not quite the breadth of the face plate so that the work can be readily gripped by the vises at back and front in the vicinity of the cutting tools. The back vise *b*, as shown, actually projects a short distance into the hollow rear side of the face plate. The face plate is revolved by means of the driving wheel *o* on the driving shaft *n*, this wheel engaging external teeth *h*¹ on the face plate.

The tool holders *i*, *j*, each work on a V guide 1 on the front of the face plate of the machine and are each moved by means of a screw 2 driven by worm gear 3, 4, from a shaft 5. The shafts 5 are operated by spur pinions 6 driven by an externally toothed annulus 8 which is turnably carried on the inwardly projecting flange 20 of the face plate and 8 can be rotated at a higher speed than that of the face plate by means of a spur wheel 9 on the shaft 10 carried by a bracket 11, the shaft 10 being driven by change wheels 12, 13, from a wheel 14 slidably mounted on the shaft 15. This wheel 14 has, as shown at Fig. 3, a clutch part 14ª whereby it can be clutched to the clutch part 21ª at the end of the sleeve extension 21ᵇ of the spur wheel 21 which is keyed to the shaft 15 and whose teeth engage the teeth *h*¹ of the face plate *h*. The wheel 14 has a sleeve extension 14ᵇ provided at its end with a friction wheel 24 capable of being thrown into engagement with the part 23ª of the gear casing 23. By operating the forked clutch-lever 17 which is adapted to move the gear wheel 14 this wheel can be either clutched to the wheel 21 so as to drive the feed gear or be moved out of engagement with the wheel 21 so as to stop the feed or be moved so as to put the wheel 24 into frictional engagement with the surface 23 so as to hold the gear and the annulus 8 stationary whereupon the continued revolution of the face plate will cause the tool slides to move the tools away from the work.

22 (Fig. 2) is a ring which is secured to the flange 20 and retains the annulus 8 in position thereon.

As will be seen the tool slides are arranged at the front of the face plate while the gearing for effecting the feed of the tools is arranged at the back thereof.

Having now fully described my invention what I claim and desire to secure by Letters Patent is:—

1. A machine of the character referred to, having in combination, a narrow annular peripheral bearing, an annular face plate carried thereby, means for rotating the face plate, tool feed mechanism on the face plate, screw means for operating same, a toothed annulus concentric with and rotatably mounted on the face plate, means driven by the annulus for operating said screw means and means for driving the annulus.

2. A machine of the character referred to, having, in combination, a narrow annular peripheral bearing, an annular face plate carried thereby, means for rotating the face plate, tool feed mechanism on the face plate, screw means for operating same, a toothed annulus concentric with and rotatably mounted on the face plate, means driven by the annulus for operating said screw means and means operated by the face plate for driving the annulus.

3. A machine of the character referred to, having, in combination, a narrow annular peripheral bearing, an annular face plate carried thereby, means for rotating the face plate, tool feed mechanism on the face plate, screw means for operating same, a toothed annulus carried by the face plate and revoluble thereon, means driven by the annulus for operating said screw means, and means operated by the face plate and carried by the bearing for driving the annulus.

4. A machine of the character referred to, having, in combination, a narrow annular peripheral bearing, an annular face plate carried thereby, means for rotating the face plate from the exterior thereof, tool feed mechanism on the face plate, screw means for operating same, a toothed annulus carried by the face plate and revoluble thereon, means driven by the annulus for operating said screw means and means for driving the annulus.

5. A machine of the character referred to, having, in combination, a narrow annular peripheral bearing, an annular face plate carried thereby, means for rotating the face plate, tool feed mechanism on the face plate, screw means for operating same, a toothed annulus carried by the face plate and revoluble thereon, means driven by the annulus for operating said screw means and means for driving the annulus.

6. A machine of the character referred to, having, in combination, a narrow annular peripheral bearing, an annular face plate carried thereby, means for rotating the face plate, tool feed mechanism on the face plate, screw means for operating same, a toothed annulus carried by the face plate and revoluble thereon, worm gear driven by the annulus for operating said screw means and means for driving the annulus.

7. A machine of the character referred to, having, in combination, a narrow annular peripheral bearing, an annular face plate carried thereby, means for rotating the face plate, tool feed mechanism on the face plate, screw means for operating same, a toothed annulus carried on a rearward extension of the face plate and revoluble thereon, means driven by the annulus for operating said screw means, and means for driving the annulus.

8. A machine of the character referred to, having, in combination, a narrow annular peripheral bearing, an annular face plate having a cavity at the back thereof and revoluble in said bearing, means for rotating the face plate, tool feed mechanism in the cavity of said face plate, screw means for operating same, a toothed annulus carried by the face plate and revoluble thereon, means driven by the annulus for operating said screw means and means for driving the annulus.

9. A machine of the character referred to, having, in combination, a narrow annular peripheral bearing, an annular face plate carried thereby, means for rotating the face plate, tool feed mechanism on the face plate, screw means for operating same, a toothed annulus carried by the face plate and revoluble thereon, means driven by the annulus for operating said screw means, means for driving the annulus and means for holding the annulus against rotation.

10. A machine of the character referred to, having, in combination, a narrow annular peripheral bearing, an annular face plate carried thereby, means for rotating the face plate, tool feed mechanism on the face plate, screw means for operating same, a toothed annulus carried by the face plate and revoluble thereon, means driven by the annulus for operating said screw means, means for driving the annulus and means whereby the annulus can be put into and out of operation or be held stationary.

11. A machine of the character referred to, having, in combination, a narrow annular peripheral bearing, an annular face plate carried thereby, means for rotating the face plate, tool feed mechanism on the face plate, screw means for operating same, a toothed annulus carried by the face plate and revoluble thereon, means driven by the annulus for operating said screw means, means for driving the annulus and means operable by a single lever whereby the annulus can be put into and out of operation or be held stationary.

In testimony whereof I affix my signature in presence of two witnesses.

CHARLES HENRY CLIFTON.

Witnesses:
JAMES SYME, Jr.,
JOHN H. McCUNN, Jr.

Copies of this patent may be obtained for five cents each, by addressing the "Commissioner of Patents, Washington, D. C."